United States Patent
Cha

(10) Patent No.: US 9,326,131 B2
(45) Date of Patent: Apr. 26, 2016

(54) APPARATUS AND METHOD FOR PROVIDING SUBSCRIBER IDENTITY MODULE (SIM) APPLICATION TOOLKIT SERVICE IN MOBILE COMMUNICATION SYSTEM

(75) Inventor: Du-Jin Cha, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1268 days.

(21) Appl. No.: 12/168,496

(22) Filed: Jul. 7, 2008

(65) Prior Publication Data
US 2009/0011745 A1    Jan. 8, 2009

(30) Foreign Application Priority Data
Jul. 5, 2007 (KR) .......................... 2007-0067481

(51) Int. Cl.
| | |
|---|---|
| H04M 3/42 | (2006.01) |
| H04W 8/24 | (2009.01) |
| H04W 4/00 | (2009.01) |
| H04W 8/18 | (2009.01) |
| H04L 29/08 | (2006.01) |
| H04W 4/14 | (2009.01) |

(52) U.S. Cl.
CPC .............. *H04W 8/245* (2013.01); *H04W 4/001* (2013.01); *H04W 4/003* (2013.01); *H04L 67/16* (2013.01); *H04W 4/14* (2013.01); *H04W 8/183* (2013.01)

(58) Field of Classification Search
CPC ....... H04W 8/183; H04W 8/245; H04W 4/14; H04W 4/001; H04W 4/003; H04W 24/00; H04W 4/00; H04L 67/16; H04M 3/42; H04M 3/16; H04M 3/00; H04M 1/00; H04M 15/751; H04M 15/7556; H04B 7/00; H04B 1/38
USPC ............................................... 455/558, 414.1
See application file for complete search history.

(56) References Cited

U.S. PATENT DOCUMENTS

| | | | | |
|---|---|---|---|---|
| 5,928,324 | A * | 7/1999 | Sloan .............................. | 709/203 |
| 6,885,871 | B2 * | 4/2005 | Caloud .......................... | 455/466 |
| 7,139,570 | B2 * | 11/2006 | Elkarat et al. ............... | 455/432.3 |
| 7,286,852 | B2 * | 10/2007 | Imura ............................ | 455/558 |
| 7,406,332 | B1 * | 7/2008 | Gaillard et al. ............... | 455/558 |
| 7,418,252 | B2 * | 8/2008 | Erskine et al. ................ | 455/405 |
| 7,481,373 | B2 * | 1/2009 | Cricco ........................... | 235/492 |
| 7,890,140 | B2 * | 2/2011 | Lee et al. ....................... | 455/558 |
| 2004/0147284 | A1 * | 7/2004 | Laumen et al. ................ | 455/558 |
| 2005/0277432 | A1 | 12/2005 | Viana et al. | |

FOREIGN PATENT DOCUMENTS

| | | |
|---|---|---|
| KR | 1020040106357 | 12/2004 |
| WO | WO 03032664 A1 * | 4/2003 |

OTHER PUBLICATIONS

"Vodaphone Offers SIM Upgrade", XP-002480098, Internet Citation, 2004.
European Search Report dated Mar. 26, 2015 issued in counterpart application No. 08159732.0-1853.

* cited by examiner

*Primary Examiner* — Meless Zewdu
(74) *Attorney, Agent, or Firm* — The Farrell law Firm, P.C.

(57) ABSTRACT

An apparatus and method for providing a Subscriber Identity Module (SIM) Application Toolkit (SAT) service in a mobile communication system is provided. The mobile communication system includes a toolkit management server and a mobile communication terminal. The mobile communication terminal includes a SIM card having a connection command for the toolkit management server.

12 Claims, 4 Drawing Sheets

APPARATUS AND METHOD FOR PROVIDING SUBSCRIBER IDENTITY MODULE (SIM) APPLICATION TOOLKIT SERVICE IN MOBILE COMMUNICATION SYSTEM

PRIORITY

This application claims priority under 35 U.S.C. §119 to an application filed in the Korean Intellectual Property Office on Jul. 5, 2007, and assigned Serial No. 2007-0067481, the contents of which are incorporated herein by reference.

BACKGROUND OF THE INVENTION

1. Field of the Invention

The present invention generally relates to an apparatus and method for providing a Subscriber Identity Module (SIM) Application Toolkit (SAT) service in a mobile communication system, and in particular, to an apparatus and method for providing an SAT service in a mobile communication system.

2. Description of the Related Art

In general, an SAT refers to a series of commands and procedures for providing a specific service of a network operator to users of mobile communication terminals. The SAT functions as an interface for mutual communication between a SIM and Mobile Equipment (ME) (i.e., a mobile communication terminal minus the SIM).

An SAT service can be provided only when both the SIM and the ME support the SAT. In an SAT session, the SIM transmits a processing command to the ME to start communication with a user of a mobile communication terminal. As defined in the $3^{rd}$ Generation Partnership Project (3GPP) Technical Specification (TS) 31.111 Universal Subscriber Identity Module (USIM) Application Toolkit (USAT), 3GPP TS 11.14 Specification of the SIM Application Toolkit for the Subscriber Identity Module-Mobile Equipment (SIM-ME) Interface, commands for operating the SAT include a proactive command directed from the SIM to the ME and an envelope command directed from the ME to the SIM.

The proactive command includes Display Text, Get Inkey, Get Input, More Time, Play Tone, Poll Interval, Refresh, Set Up Menu, Select Item, Send Short Message (SM), Send Supplementary Service (SS), Send Unstructured Supplementary Service Data (USSD), Set Up Call, Polling Off, Provide Local Information, Set Up Even List, Perform Card Application Protocol Data Unit (APDU), Power Off Card, Power On Card, Get Reader Status, Timer Management, Set Up Idle Mode Text, Run At Command, Send Dual Tone Multi-Frequency (DTMF), Language Notification, Launch Browser, Open Channel, Close Channel, Send Data, Get Channel Status, Service Search, Get Service Information, and Declare Service. The envelope command includes Data download to SIM, Menu Selection, Call Control by SIM, Timer Expiration, and Event Download.

Service providers combine such commands with each other and transmit/receive the combined commands through a Short Message Service (SMS) to provide specific information services. Service providers usually develop their own specific services such as connection of a call to a specific service number through the combination of the commands to provide SIM applications.

A conventional terminal can only provide a built-in SAT service implemented in advance by a service provider through an SAT for a specified service in a SIM. Accordingly, user of the mobile communication terminal can only select an SAT menu provided in the terminal and request a specified service such as weather information and traffic information, by sending a text message through the SAT menu or by using the calling function of the mobile communication terminal.

Diverse SAT services are being developed according to the demand of users and the development of terminals. However, the storage space of a SIM card is not large enough to store the diverse SAT services.

Information required for detecting the results of an SAT service may be requested using a Short Message Service (SMS) message or a Multimedia Messaging System (MMS) message. In this case, a mobile communication terminal must be allocated a channel for the SMS message or the MMS message, which may cause frequent requests for radio resources.

Result information generated during an SAT service may be received using an SMS message or an MMS message. In this case, a mobile communication terminal must terminate an SAT service mode and switch to a mode for detecting the SMS message or the MMS message, which causes an inconvenience to the user.

Unstructured Supplementary Service Data (USSD) has been introduced to support a provider-defined service, which is used to transmit information or specific commands from a GSM (Global System for Mobile communications) network.

There are a variety of SSs (Supplementary Services) in the GSM, which can be operated using a series of strings. Examples of the service operation using a series of strings include service activation/deactivation and interrogation. Input strings are specified in the GSM standards, which are interpreted by a mobile communication terminal prior to transmission to the network.

In the case of the USSD, if a string is input by a user, a mobile communication terminal fails to interpret the input string and transmits the corresponding data to the network. The mobile communication terminal receives information from the network and displays the received information. A command can be transmitted from the mobile communication terminal to the network, which enables communication with the GSM network.

The data transmission rate of the USSD service is up to about 7 times higher than that of the SMS. Both the SMS and the USSD use a signaling channel. The SMS allocates one channel to each message. However, the USSD is session-oriented and the connection is maintained until it is terminated by the user.

SUMMARY OF THE INVENTION

An object of the present invention is to solve at least the above problems and/or disadvantages and to provide at least the advantages below. Accordingly, an object of the present invention is to provide an apparatus and method for providing diverse SAT services according to the demand of users and the development of terminals.

Another object of the present invention is to provide an apparatus and method for providing an SAT service without frequent allocation of radio resources.

Still another object of the present invention is to provide an apparatus and method for detecting the performance results of an SAT service without termination of the SAT service.

According to one aspect of the present invention, a mobile communication system for providing an SAT service includes a toolkit management server and a mobile communication terminal. The toolkit management server stores SAT services, transmits a menu of available SAT services at the request of a mobile communication terminal, performs a selected SAT service, and transmits the performance results of the selected SAT service to the mobile communication terminal. The mobile communication terminal includes a SIM card having a connection command for the toolkit management server. The mobile communication terminal displays a menu of SAT services that can be provided by the toolkit management server by connecting to the toolkit management server upon detection of an SAT service request from a user. When a desired SAT service is selected from the menu by the user, the mobile communication terminal transmits the selected SAT service to the toolkit management server, receives the performance results of the selected SAT service from the toolkit management server, and displays the received performance results.

According to another aspect of the present invention, a mobile communication terminal for providing an SAT service includes a SIM card having a connection command for a toolkit management server; a connection manager for detecting an SAT service request, receiving the connection command from the SIM card, and setting a connection with the toolkit management server; and a service processor for receiving a menu message including a menu of available SAT services from the toolkit management server, and displaying the menu of the received menu message.

According to still another aspect of the present invention, a toolkit management server for providing an SAT service includes an application storage unit for storing diverse applications for an SAT service; a connection manager for connecting communication with a mobile communication terminal at a communication connection request; and a service manager for generating a menu message including a menu of available SAT services by searching the application storage after the communication connection with the mobile communication terminal, and transmitting the generated menu message to the mobile communication terminal.

According to even another aspect of the present invention, a method for providing an SAT service in a mobile communication terminal includes detecting an SAT service request and connecting communication with a toolkit management server according to a connection command for the toolkit management server stored in a SIM card; receiving a menu message including a menu of available SAT services from the toolkit management server; and displaying the menu included in the received menu message.

According to yet another aspect of the present invention, a method for providing an SAT service in a toolkit management server includes connecting communication with a mobile communication terminal at a communication connection request; searching available SAT services after the communication connection with the mobile communication terminal; and generating a menu message including a menu of the available SAT services and transmitting the generated menu message to the mobile communication terminal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention is to provide an apparatus and method for providing an SIM Application Toolkit (SAT) service in a mobile communication system, in which a toolkit management server performs an SAT service and transmits the results thereof to a mobile communication terminal so that the mobile communication terminal can operate as a browser. The toolkit management server stores and manages SATs. Also, the toolkit management server performs a service requested by a mobile communication terminal and transmits the results of the service to the mobile communication terminal. The toolkit management server and the mobile communication terminal transmit/receive messages using an Unstructured Supplementary Service Data (USSD) service.

Figure 1:
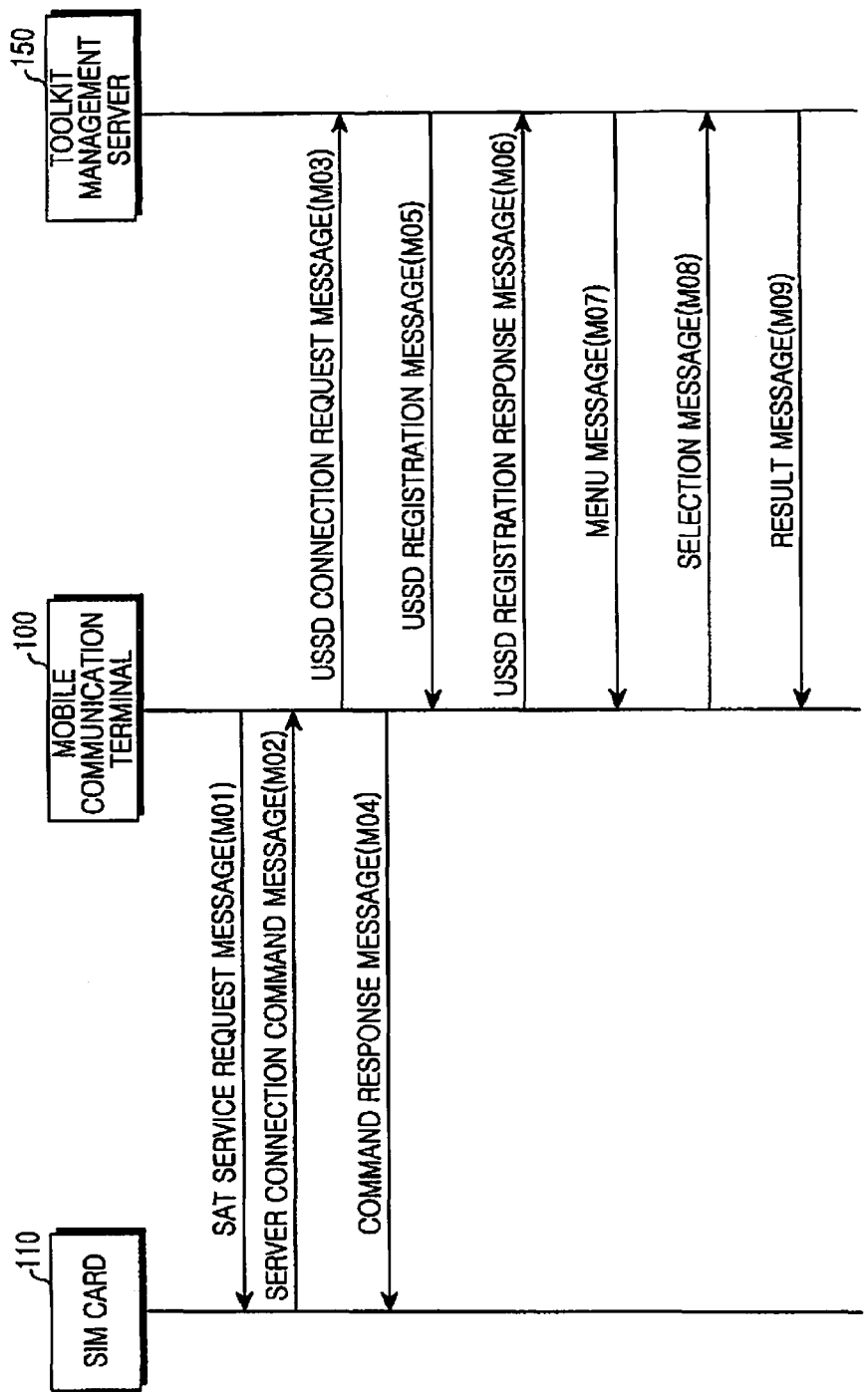
FIG. 1 is a diagram illustrating a message flow between a SIM card, a mobile communication terminal, and a toolkit management server according to the present invention.

FIG. 1 is a diagram illustrating a message flow between a SIM card, a mobile communication terminal, and a toolkit management server according to the present invention.

Upon receipt of a request for an SAT service, a mobile communication terminal 100 transmits an SAT service request message M01 (a beacon USSD message) to a SIM card 110. Upon receipt of the SAT service request message M01, the SIM card 110 transmits a server connection command message M02 to the mobile communication terminal 100, which is a kind of proactive command used for transmission from a SIM card to a mobile communication terminal.

Upon receipt of the server connection command message M02, the mobile communication terminal 100 transmits a USSD connection request message M03 to a toolkit management server 150 providing an SAT service and transmits a command response message M04 to the SIM card 110. The USSD connection request message M03 is to request USSD session connection with the toolkit management server 150 to receive a USSD service. The command response message M04 is to inform that a command corresponding to the SAT service request message M01 has been executed normally.

Thereafter, upon receipt of a USSD registration message M05 from the toolkit management server 150, the mobile communication terminal 100 performs USSD session connection with the toolkit management server 150. The USSD registration message M05 includes information necessary for USSD session connection. If the USSD session connection is successful, the mobile communication terminal 100 transmits a USSD registration response message M6 to the toolkit management server 150. If the USSD session connection has failed or has been cancelled by the user, the mobile communication terminal 100 transmits a USSD registration failure message (facility return error, reject by user) to the toolkit management server 150.

Thereafter, upon receipt of a menu message M07 (a USSD menu system message) from the toolkit management server 150, the mobile communication terminal 100 transmits a selection message M08 (a USSD menu system message return result) to the toolkit management server 150. The menu message M07 includes menu information of SAT services, and the selection message M08 includes information of an SAT service selected by the user from a menu included in the menu message M07.

Upon receipt of the selection message M08, the toolkit management server 150 performs the selected SAT service and transmits a result message M09 (a USSD text request message) to the mobile communication terminal 100. The result message M09 includes the performance results of the SAT service. If supplementary SAT services requiring additional selection are generated by the performance of the selected SAT service, the toolkit management server 150 generates and transmits a new menu message M07 to the mobile communication terminal 100. The new menu message M07 includes information of the supplementary SAT services.

If the mobile communication terminal 100 receives the result message M09 after transmission of the selection message M08, the mobile communication terminal 100 outputs the SAT service performance results included in the result message M09. However, if the mobile communication terminal 100 receives the new menu message M07 including the information of the supplementary SAT services, the mobile communication terminal 100 again generates and transmits the selection message M08, which includes an SAT service selected by the user, to the toolkit management server 150.

The formats of the messages between the mobile communication terminal 100 and the toolkit management server 150 are specified in ETSI EN 300 957, that is the standard specification of the USSD.

Figure 2:
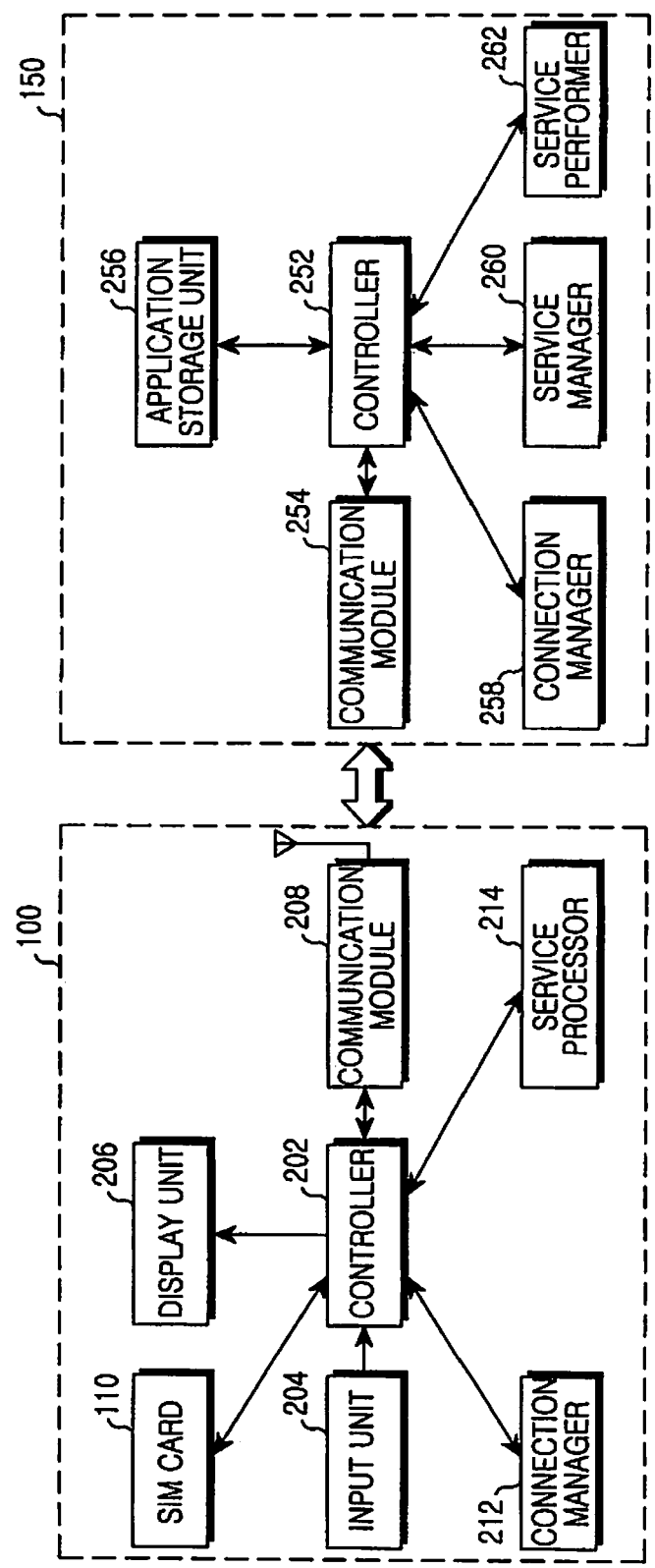
FIG. 2 is a block diagram of an SAT service providing apparatus according to the present invention.

FIG. 2 is a block diagram of an SAT service providing apparatus according to the present invention.

The SAT providing apparatus includes a mobile communication terminal 100 and a toolkit management server 150.

The mobile communication terminal 100 includes a SIM card 110, a controller 202, an input unit 204, a display unit 206, a communication module 208, a connection manager 212, and a service processor 214.

The input unit 204 includes a keypad (not shown) to provide user data to the controller 202. The keypad may include, but is not limited to, numeric keys of digits 0-9 and a plurality of function keys, such as a Menu key, a Cancel (delete) key, a confirmation key, a talk key, an end key, an Internet connection key, and navigation keys (▲/▼/◄/►).

The display unit 206 displays a predetermined number of numerals and characters, moving pictures, still pictures, and status information (or indicator) generated during the operation of the mobile communication terminal 100. The display unit 206 may be a color Liquid Crystal Display (LCD). According to the present invention, the display unit 206 displays an SAT service menu and the performance results of an SAT service under the control of the controller 202.

The communication module 208 receives a Radio-Frequency (RF) signal through an antenna and performs down-conversion, despreading, and channel decoding on the received RF signal. Also, the communication module 208 performs channel coding, spreading, and up-conversion on TX data and transmits the resulting data through the antenna. In addition, the communication module 208 transmits/receives messages for the USSD session connection and the USSD service according to the present invention.

Upon detection of an SAT service request from the user, the connection manager 212 transmits an SAT service request message M01 to the SIM card 110. Upon receipt of a server connection command message M02 from the SIM card 110, the connection manager 212 transmits a USSD connection request message M03 to the toolkit management server 150. The server connection command message M02 is to command connection to the toolkit management server 150, and the USSD connection request message M03 is to request USSD session connection. If the message has been transmitted normally, the connection manager 212 transmits a command response message M04 to the SIM card 110. The command response message M04 is to inform that a command corresponding to the SAT service request message M01 has been executed normally.

Thereafter, upon receipt of a USSD registration message M05 from the toolkit management server 150, the connection manager 212 performs USSD session connection with the toolkit management server 150. The USSD registration message M05 includes information necessary for USSD session connection. If the USSD session connection has been successful, the connection manager 212 transmits a USSD registration response message M6 to the toolkit management server 150. If the USSD session connection has failed or has been cancelled by the user, the connection manager 212 transmits a USSD registration failure message to the toolkit management server 150.

Upon receipt of a menu message M07, which includes menu information of SAT services, from the toolkit management server 150, the service processor 214 displays the included menu information on the display unit 206. When an SAT service is selected from the menu through the input unit 204, the service processor 214 transmits a selection message M08 to the toolkit management server 150. The selection message M08 includes information of the selected SAT service. Upon receipt of a result message M09 including the performance results of the selected SAT service, the service processor 214 displays the SAT service performance results on the display unit 206.

The SIM card 110 stores phone numbers, phone number charge, and user data. Upon receipt of the SAT service request, the SIM card 110 transmits the server connection command message M02 to the connection manager 212.

The controller 202 controls an overall operation of the mobile communication terminal 100. The controller 202 can control the connection manager 212 and the service processor 214. That is, the controller 202 can perform the functions of the connection manager 212 and the service processor 214. Although separate units are provided for respective functions of the controller 202, the controller 202 may perform all or some of the functions instead of such separate units.

The toolkit management server 150 includes a controller 252, a communication module 254, an application storage unit 256, a connection manager 258, a service manager 260, and a service performer 262.

The communication module 254 transmits/receives messages for the USSD service and the USSD session connection with the mobile communication terminal 100. The application storage unit 256 stores various applications for an SAT service.

Upon receipt of the USSD connection request message M03 from the mobile communication terminal 100, the connection manager 258 generates and transmits the USSD registration message M05 to the mobile communication terminal 100. If the USSD registration response message M06 is received from the mobile communication terminal 100, the connection manager 258 determines that the USSD session connection with the mobile communication terminal 100 is successful.

When the USSD session is connected, the service manager 260 detects available SAT services by searching the application storage unit 256, generates the menu message M07 including the menu information, that is, information of the available SAT services, and transmits the generated menu message M07 to the mobile communication terminal 100. Upon receipt of the selection message M08 including information of the selected SAT service from the mobile communication terminal 100, the service manager 260 provides the selected SAT service to the service performer 262.

Thereafter, the service manager 260 receives the performance results of the service performer 262, generates the result message M09 including the received performance results, and transmits the generated result message M09 to the mobile communication terminal 100. If the received performance results correspond to a menu of supplementary SAT services requiring additional selection, the service manager 260 generates and transmits the menu message M07 to the mobile communication terminal 100.

The service performer 262 performs the SAT service received from the service manager 260, and provides the service performance results to the service manager 260. The service performance results may be texts or images requiring no more selection, or may be supplementary SAT services requiring additional selection of the user.

The controller 252 controls an overall operation of the toolkit management server 150. The controller 252 can control the connection manager 258, the service manager 260, and the service performer 262. The controller 252 can perform the functions of the connection manager 258, the service manager 260, and the service performer 262. Although separate units are provided for respective functions of the controller 252, the controller 252 may perform all or some of the functions instead of such separate units.

Figure 3:
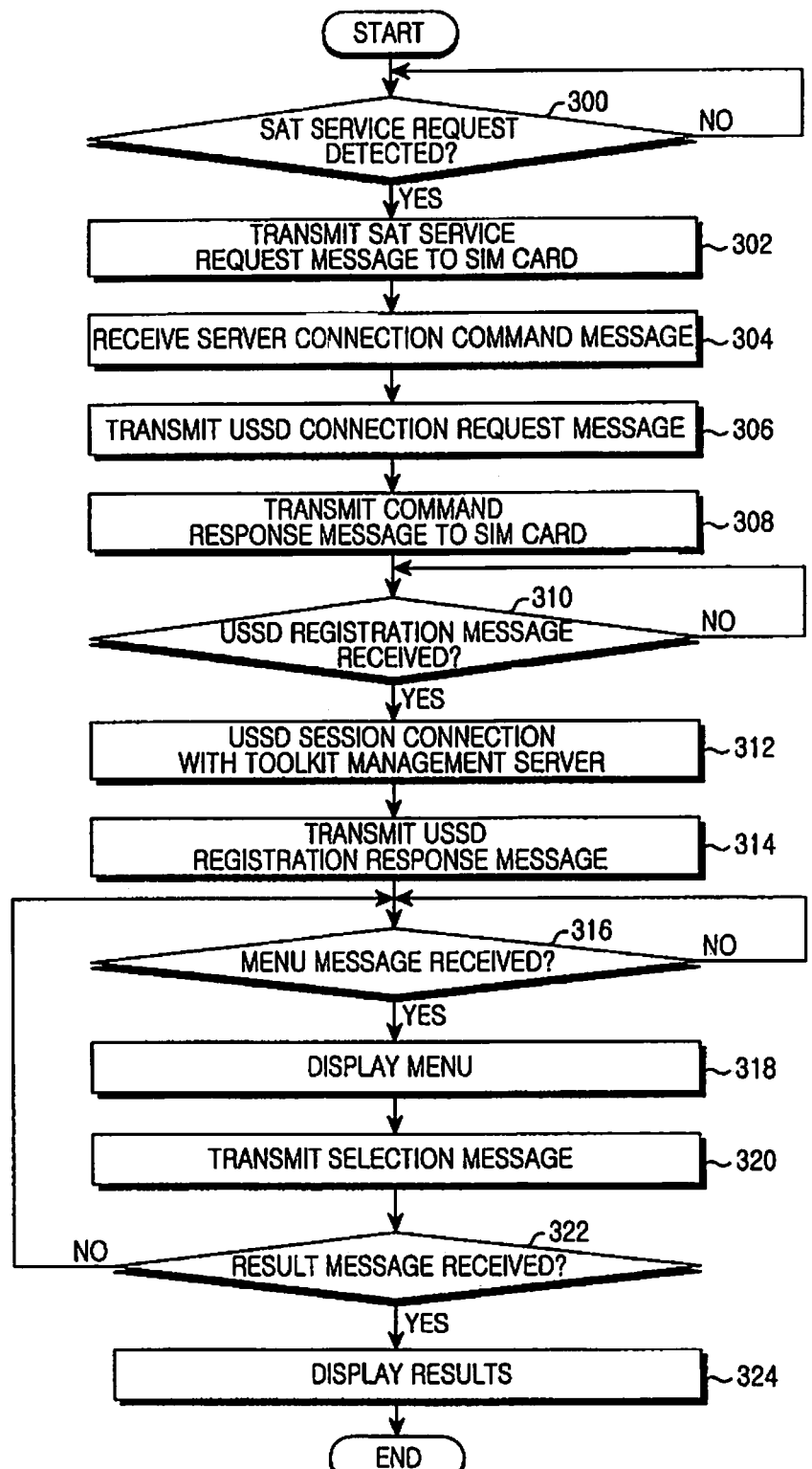
FIG. 3 is a flowchart illustrating a procedure for providing an SAT service in the mobile communication terminal according to the present invention.

FIG. 3 is a flowchart illustrating a procedure for providing an SAT service in the mobile communication terminal according to the present invention.

If the mobile communication terminal detects an SAT service request from the user in step 300, the procedure proceeds to step 302. In step 302, the mobile communication terminal transmits an SAT service request message M01 to the SIM card to request an SAT service. In step 304, the mobile communication terminal receives a server connection command message M02 from the SIM card. The server connection command message M02 is to command connection to a server providing an SAT service. In step 306, the mobile communication terminal transmits a USSD connection request message M03 to the toolkit management server. The USSD connection request message M03 is to request USSD session connection. In step 308, the mobile communication terminal transmits a command response message M04 to the SIM card. The command response message M04 is to inform that a command corresponding the SAT service request message M01 has been executed normally.

In step 310, the mobile communication terminal determines if a USSD registration message M05 including information necessary for the USSD session connection is received from the toolkit management server. If the USSD registration message M05 is received from the toolkit management server, the procedure proceeds to step 312. In step 312, the mobile communication terminal performs USSD session connection with the toolkit management server. In step 314, the mobile communication terminal transmits a USSD registration response message M06 to the toolkit management server. The USSD registration response message M06 is to inform that the USSD session connection is successful.

In step 316, the mobile communication terminal determines if a menu message M07 is received. The menu message M07 includes a menu, that is, a set of SAT services provided by the toolkit management server. If the menu message M07 is received, procedure proceeds to step 318. In step 318, the mobile communication terminal displays the menu included in the menu message M07. In step 320, the mobile communication terminal generates and transmits a selection message M08 to the toolkit management server. The selection message M08 includes information of an SAT service selected by the user. In step 322, the mobile communication terminal determines whether a result message M09 is received from the toolkit management server. If the result message M09 is received, the procedure proceeds to step 324; and if not the result message M09 but the menu message M07 including menu information of supplementary SAT services is received, the procedure returns to step 316.

In step 324, the mobile communication terminal displays the SAT service performance results included in the result message M09. Thereafter, the procedure is ended.

Figure 4:
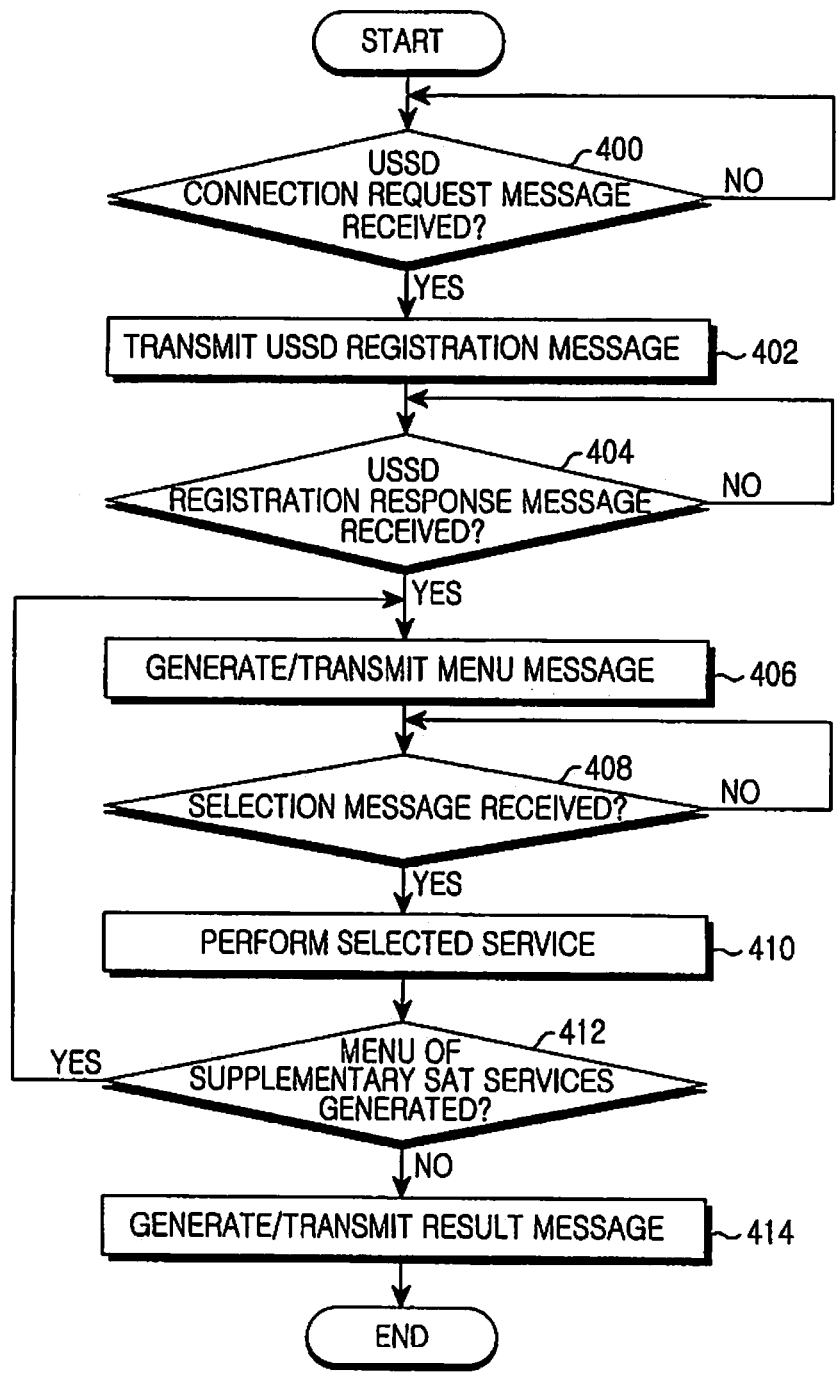
FIG. 4 is a flowchart illustrating a procedure for providing an SAT service in the toolkit management server according to the present invention.

FIG. 4 is a flowchart illustrating a procedure for providing an SAT service in the toolkit management server according to the present invention.

If the toolkit management server receives a USSD connection request message M03 from the mobile communication terminal in step 400, the procedure proceeds to step 402. In step 402, the toolkit management server generates and transmits a USSD registration message M05 to the mobile communication terminal. The USSD registration message M05 includes information necessary for USSD session connection. In step 404, the toolkit management server determines if a USSD registration response message M06 is received from the mobile communication terminal. If the USSD registration response message M06 is received from the mobile communication terminal, the procedure proceeds to step 406 (the toolkit management server determines that the USSD session connection with the mobile communication terminal has been successful).

In step 406, the toolkit management server transmits a menu message M07 to the mobile communication terminal. The menu message M07 includes menu information, that is, information of available SAT services. In step 408, the toolkit management server determines if a selection message M08 is received from the mobile communication terminal. The selection message M08 includes an SAT service selected by the user. In step 410, the toolkit management server performs the selected SAT service. In step 412, the toolkit management server determines if a menu of supplementary SAT services is generated by the performance of the selected SAT service. If the menu of the supplementary SAT services is not generated, the procedure proceeds to step 414; and if the menu of the supplementary SAT services is generated, the procedure returns to step 406 to generate a menu message M07 including the menu of the supplementary SAT services.

In step 414, the toolkit management server generates and transmits a result message M09 to the mobile communication terminal. The result message M09 includes the SAT service performance results such as texts or images. Thereafter, the procedure is ended.

As described above, the present invention provides an apparatus and method for providing an SAT service in a mobile communication system, in which a toolkit management server performs an SAT service and transmits the results thereof to a mobile communication terminal so that the mobile communication terminal can operate as a browser. Therefore, a variety of SAT services can be provided and several SIM services can be provided by one-time allocation of radio resources. Also, the performance results of an SAT service can be detected without termination of the SAT service.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for providing a Subscriber Identity Module (SIM) Application Toolkit (SAT) service at a mobile terminal, the method comprising:
   transmitting, in response to a SAT service request, a SAT service request message to a SIM card;
   receiving a server connection command message from the SIM card;
   transmitting a connection request message to a toolkit management server;
   performing, when a registration message is received from the toolkit management server, a session connection with the toolkit management server;
   displaying, when a menu message including a menu of SAT services is received from the toolkit management server, the menu;
   generating a selection message including information of a SAT service selected by a user;
   transmitting the selection message to the toolkit management server; and
   displaying performance results of the selected SAT service, when a result message is received from the toolkit management server.

2. The method of claim 1, wherein the server connection command message is configured to command connection to a server providing the SAT service.

3. The method of claim 1, wherein the connection request message is a USSD connection request message.

4. The method of claim 1, further comprising:
   transmitting a command response message to the SIM card,
   wherein the command response message indicates that a command corresponding to the SAT service request message has been executed.

5. The method of claim 1, wherein the registration message includes information for a USSD session connection.

6. The method of claim 1, further comprising:
   transmitting a registration response message to the toolkit management server,
   wherein the registration response message indicates that the session connection is successful.

7. A mobile terminal for providing a Subscriber Identity Module (SIM) Application Toolkit (SAT) service, the terminal comprising:
   a SIM card;
   a connection manager configured to transmit, in response to a SAT service request, a SAT service request message to the SIM card, receive a server connection command message from the SIM card, transmit a connection request message to a toolkit management server, and perform, when a registration message is received from the toolkit management server, a session connection with the toolkit management server;
   a display unit configured to display, when a menu message including a menu of SAT services is received from the toolkit management server, the menu; and
   a service processor configured to generate a selection message including information of a SAT service selected by a user, transmit the selection message to the toolkit management server, and control the display unit to display performance results of the selected SAT service, when a result message is received from the toolkit management server.

8. The terminal of claim 7, wherein the server connection command message is configured to command connection to a server providing the SAT service.

9. The terminal of claim 7, wherein the connection request message is a USSD connection request message.

10. The terminal of claim 7, wherein the connection manager is further configured to transmit a command response message to the SIM card, and
    wherein the command response message indicates that a command corresponding to the SAT service request message has been executed.

11. The terminal of claim 7, wherein the registration message includes information for a USSD session connection.

12. The terminal of claim 7, wherein the connection manager is further configured to transmit a registration response message to the toolkit management server, and
    wherein the registration response message indicates that the session connection is successful.

* * * * *